United States Patent
Raj et al.

(10) Patent No.: US 11,527,080 B2
(45) Date of Patent: Dec. 13, 2022

(54) SYSTEM AND METHOD FOR CLASSIFICATION OF OBJECTS IN VEHICLE USING FEATURE VECTORS

(71) Applicant: PathPartner Technology Private Limited, Karnataka (IN)

(72) Inventors: Santhana Raj, Karnataka (IN); Dipanjan Ghosh, Karnataka (IN)

(73) Assignee: PATHPARTNER TECHNOLOGY PRIVATE LIMITED, Karnataka (IN)

( * ) Notice: Subject to any disclaimer, the term of this patent is extended or adjusted under 35 U.S.C. 154(b) by 200 days.

(21) Appl. No.: 17/182,585

(22) Filed: Feb. 23, 2021

(65) Prior Publication Data

US 2022/0198205 A1 Jun. 23, 2022

(30) Foreign Application Priority Data

Dec. 22, 2020 (IN) .............................. 202041055923

(51) Int. Cl.
*G06V 20/59* (2022.01)
*G06V 20/64* (2022.01)
*G06K 9/62* (2022.01)

(52) U.S. Cl.
CPC .......... *G06V 20/59* (2022.01); *G06K 9/6267* (2013.01); *G06V 20/64* (2022.01)

(58) Field of Classification Search
None
See application file for complete search history.

(56) References Cited

U.S. PATENT DOCUMENTS

| | | | |
|---|---|---|---|
| 9,707,911 B1 * | 7/2017 | Myers | H04W 4/70 |
| 9,779,565 B2 * | 10/2017 | Rabbat | G08C 17/02 |
| 10,154,029 B1 * | 12/2018 | Griffin | H04L 9/0861 |
| 10,315,665 B2 * | 6/2019 | Halder | G05D 1/021 |
| 10,464,530 B2 * | 11/2019 | Falkson | B60R 25/257 |
| 10,503,990 B2 * | 12/2019 | Gleeson-May | B60R 25/25 |
| 11,172,339 B1 * | 11/2021 | Hummer | G08B 21/12 |
| 2012/0215375 A1 * | 8/2012 | Chang | B60W 50/08 |
| | | | 701/1 |
| 2014/0041301 A1 * | 2/2014 | Oakley | E05B 81/74 |
| | | | 49/506 |
| 2015/0045984 A1 * | 2/2015 | Hui | B60N 2/002 |
| | | | 701/1 |
| 2015/0169225 A1 * | 6/2015 | Curley | H04L 67/1095 |
| | | | 711/162 |
| 2015/0191178 A1 * | 7/2015 | Roy | H04W 4/027 |
| | | | 701/36 |
| 2015/0242605 A1 * | 8/2015 | Du | G06F 21/31 |
| | | | 726/7 |

(Continued)

*Primary Examiner* — Fekadeselassie Girma
(74) *Attorney, Agent, or Firm* — Tucker Ellis LLP

(57) ABSTRACT

The present disclosure relates to a system for differentiating objects present in a vehicle, the system includes one or more sensors placed within a vehicle to generate a set of signals in response to an object being present within the vehicle. An ADC converts the received set of signals to a digital form. A processor receives the digital set of signals, and process the received digital set of signals, to generate point cloud dataset. The processor extracts, from the point cloud dataset, a first set of features pertaining to a single frame and a second set of features pertaining to a multi-frame. The extracted set of features are provided as input to a classifier to differentiate the object present in one or more zones within the vehicle.

10 Claims, 4 Drawing Sheets

(56) References Cited

U.S. PATENT DOCUMENTS

| | | | | |
|---|---|---|---|---|
| 2015/0283902 A1* | 10/2015 | Tuukkanen | ............ | G06T 19/006 340/461 |
| 2016/0001782 A1* | 1/2016 | Fiedler | ................. | B60W 40/09 340/5.81 |
| 2016/0086397 A1* | 3/2016 | Phillips | ................. | G07C 5/008 701/1 |
| 2016/0300050 A1* | 10/2016 | Hecht | ................... | H04W 12/06 |
| 2017/0186054 A1* | 6/2017 | Fish | ................... | G06Q 30/0282 |
| 2017/0197568 A1* | 7/2017 | DeCia | ................... | B60R 16/037 |
| 2017/0320501 A1* | 11/2017 | Li | ........................... | B60K 37/06 |
| 2017/0369071 A1* | 12/2017 | Gould | ................... | B60R 25/24 |
| 2018/0018179 A1* | 1/2018 | Scheufler | ............. | H04L 67/306 |
| 2018/0053070 A1* | 2/2018 | Pavek | ................... | G06K 9/623 |
| 2018/0262738 A1* | 9/2018 | Kapuria | ............... | G01S 7/4972 |
| 2018/0339708 A1* | 11/2018 | Geller | ................. | B60L 3/0015 |
| 2019/0066424 A1* | 2/2019 | Hassani | ............... | B60R 25/252 |
| 2019/0227954 A1* | 7/2019 | Shi | ....................... | G06F 13/102 |
| 2020/0160263 A1* | 5/2020 | Kuettner | ........... | G06Q 10/0832 |
| 2020/0276503 A1* | 9/2020 | Marchiorello | ........ | A63F 13/798 |
| 2020/0310528 A1* | 10/2020 | Upmanue | ............ | H04N 5/2253 |
| 2020/0334581 A1* | 10/2020 | Skaling | ................ | H04W 12/77 |
| 2020/0349666 A1* | 11/2020 | Hodge | ................... | G08G 1/017 |
| 2021/0041554 A1* | 2/2021 | Ramesh | ................. | G01S 7/415 |
| 2021/0272125 A1* | 9/2021 | Kopf | ............. | G06Q 20/38215 |
| 2021/0333351 A1* | 10/2021 | Zandifar | ................ | G01S 5/02 |
| 2021/0396861 A1* | 12/2021 | Wellig | ................... | G01S 13/06 |
| 2021/0398691 A1* | 12/2021 | Dhamija | ............... | G16H 50/80 |
| 2022/0198205 A1* | 6/2022 | Raj | ........................... | G01S 7/41 |

\* cited by examiner

SYSTEM AND METHOD FOR CLASSIFICATION OF OBJECTS IN VEHICLE USING FEATURE VECTORS

RELATED APPLICATION DATA

This application claims priority to Indian application number IN 202041055923, with a filing date of Dec. 22, 2020, the entirety of which is incorporated by reference herein.

TECHNICAL FIELD

The present disclosure relates, in general, to a sensing system, and more specifically, relates to frequency modulated continuous wave (FMCW) radar sensing for classification of objects in a vehicle using feature vectors.

BACKGROUND

Radar FMCW technology is nowadays widely used to detect objects of interest within a seat occupancy zone in a vehicle. Occupancy sensors based on radar technology offer some advantages in comparison to other occupancy detection methods. It is a contactless and invisible measurement system, which can easily be integrated. Few exemplary existing technologies in the field of radar systems may use vital signs for occupancy detection by measuring the smallest motions like heartbeat or breathing of the occupant within the range of micrometres. Few other existing technologies may use synthetic wave analysis to determine the presence of the human body, where these technologies determine the presence only when the internal temperature rises to the dangerous level.

However, these, exemplary existing technologies suffer from the limitations of inaccurate detection to determine the presence of an occupant and to distinguish the occupant, when other objects move in the vehicle, where the other objects may include engine vibration, shaking car in a bump, moving water bottle jacket and the like. Further, these existing technologies are also prone to delayed response due to the time taken to correctly establish the breathing rate and/or heart rate of the occupant and may require external accelerometer to remove car vibration.

Since radar sensors are sensitive to the smallest motions, appropriate process has to be implemented correctly to evaluate the radar signal and discriminate noise. Therefore, there is a need in the art to provide a means that can ensure faster response time, reliably detect a life present in the whole vehicle, detect occupant that are present in specific zones, and to distinguish the occupant effectively.

OBJECTS OF THE PRESENT DISCLOSURE

An object of the present disclosure relates, in general, to a sensing system, and more specifically, relates to frequency modulated continuous wave (FMCW) radar sensing for classification of objects in a vehicle using feature vectors.

Another object of the present disclosure is to provide a system that can use at least one sensor to cover more than one seat/location, with a minimum of one sensor per seat to a maximum of one sensor per whole car covering two rows, five seats, footwell and truck region Another object of the present disclosure is to provide a system that can be extended to larger vehicles like 6/7/8 seaters by increasing the field of view (FoV) of the sensor and/or by adding additional sensors of same type.

Another object of the present disclosure that ensures faster response time of less than a second, when compared to other existing radar-based approaches that use vital signs for occupancy detection Another object of the present disclosure is to provide a system that can cater various in-cabin features Another object of the present disclosure is to provide a system that can be capable to operate under contactless and low ambient light condition.

Another object of the present disclosure is to provide a system that can be capable to operate even when living objects are covered by some materials such as blanket, jacket, sun cover, cloth and the like.

Yet another object of the present disclosure is to provide a system that can be capable to distinguish person leaning on the car door from a baby sitting inside the car.

SUMMARY

The present disclosure relates, in general, to a sensing system, and more specifically, relates to frequency modulated continuous wave (FMCW) radar sensing for classification of objects in a vehicle using feature vectors.

In an aspect, the present disclosure provides a system for differentiating objects present in a vehicle, the system including one or more sensors adapted to be placed within the vehicle to generate a set of signals in response to an object being present in one or more zones within the vehicle, an analogue-to-digital converter (ADC) configured to receive the set of signals and convert the received set of signals to a digital form, and a processor operatively coupled to the one or more sensors, the processor operatively coupled to a memory, the memory storing instructions executable by the processor to receive, from the ADC, the digital set of signals, process the received digital set of signals, to generate point cloud dataset of the received digital set of signals, the point cloud dataset pertaining to any or a combination of range, angle, velocity and reflected power of the object being present in the one or more zones within the vehicle, extract, from the point cloud dataset, a first set of features pertaining to a single frame that may include any or a combination of mean of values, and distribution of values, extract, from the point cloud dataset, a second set of features pertaining to a multi-frame that may include any or a combination of time averaged values and variation over time values of the first set of features, and classify the extracted first set of features and the second set of features to extract a set of values for the classified set of features, wherein, based on the determination of the extracted set of values from classified set of features, the processor differentiates the object present in one or more zones within the vehicle.

In an embodiment, the one or more sensors may include a transmitter unit that emits signals onto the object, and a receiver unit that receives the emitted signals reflected from the object.

In another embodiment, the one or more sensors may include a mixer that combines the signals received from the transmitter unit and the receiver unit.

In another embodiment, the processor may perform fast fourier transform (FFT) on the received digital set of signals to calculate any or a combination of range and velocity of the received digital set of signals, wherein, the processor may detect prominent reflection points of the received set of signals based on predefined threshold value.

In another embodiment, processor may perform bearing angle estimation of the detected prominent reflection points, and a grouping unit may group the detected prominent reflection points.

In another embodiment, the processor operatively coupled to a classifier that receives the extracted first set of features and the second set of features to differentiate types of objects, object attributes and any combination thereof.

In another embodiment, the extracted set of features may include any or a combination of expectation of position, range/angle normalized average power, expectation of power, expectation of velocity, number of detections, detection density, gating factor, position spread, spread in velocity, spread in power, velocity distribution, distribution of power, and power distribution across velocity.

In another embodiment, the number of detections comprise total number of point cloud detections in respective one or more zones, the detection density may include volume of detections in the one or more zones and the gating factor may include the density of detections from the entire one or more zones, wherein the one or more zones may include any or a combination of specific seat positions, specific footwell regions, entire row, entire footwell region, truck region, and entire vehicle.

In another embodiment, the velocity distribution and distribution of power may include maximum number of detections across successive set of bins, and power distribution across velocity may include a ratio of total number of detections on negative side of histogram peak by total number of detections on positive side of histogram peak.

In an aspect, the present disclosure provides a method for differentiating objects present in a vehicle, the method including receiving, at a computing device, a digital set of signals, from an analogue-to-digital converter (ADC), the ADC configured to receive the set of signals from one or more sensors and convert the received set of signals to a digital form, the one or more sensors adapted to be placed within a vehicle to generate the set of signals in response to an object being present in one or more zones within the vehicle; processing, at the computing device, the received digital set of signals, to generate point cloud dataset of the received digital set of signals, the point cloud dataset pertaining to any or a combination of range, angle, velocity and reflected power of the object being present in the one or more zones within the vehicle, extracting, at the computing device, from the point cloud dataset, a first set of features pertaining to a single frame that may include any or a combination of mean of values, and distribution of values, extracting, at the computing device, from the point cloud dataset, a second set of features pertaining to a multi-frame that may include any or a combination of time averaged values and variation over time of the first set of features; and classifying, at the computing device, the extracted first set of features and the second set of features to extract a set of values for the classified set of features, wherein, based on the determination of the extracted set of values from classified set of features, the computing device differentiates the object present in one or more zones within the vehicle.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

Figure 1:
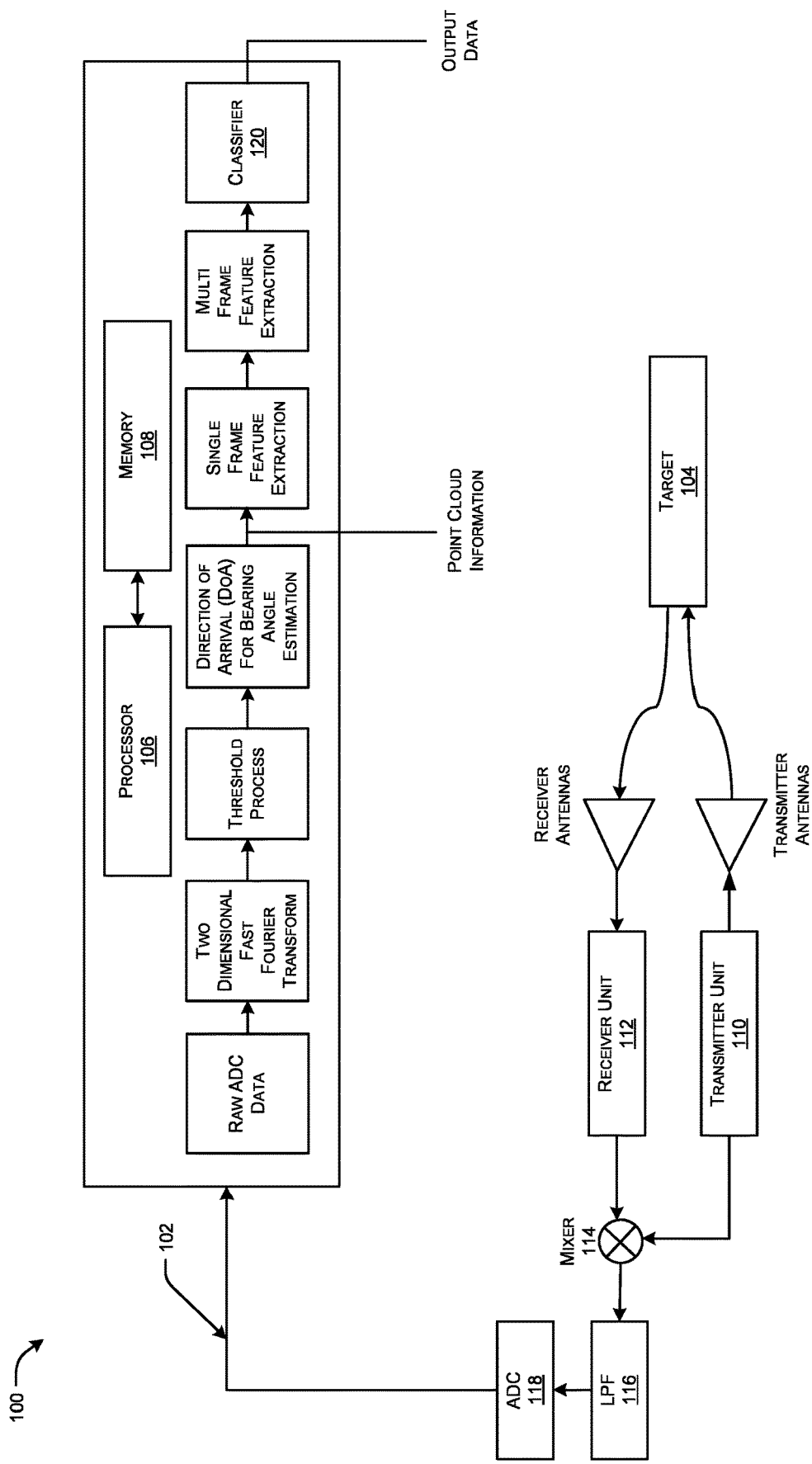
FIG. 1 illustrates an exemplary representation of a FMCW radar system for differentiating objects in a vehicle, in accordance with an embodiment of the present disclosure.

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates, in general, to a sensing system, and more specifically, relates to frequency modulated continuous wave (FMCW) radar sensing for classification of objects in a vehicle using feature vectors. The present disclosure provides a method of robust vehicle occupancy system by using a strong set of features extracted from point cloud information of FMCW radar system, which is capable of reliably detecting a life present in the whole vehicle including footwell region, detecting occupant present in specific zones, and distinguishing the present occupant as a child or adult. The present disclosure provides a robust in-cabin sensing with FMCW radar system that are applicable within the vehicle, which includes various features such as life presence detection, seat occupancy detection, adult vs child classification, child/pet left behind detection, seat belt reminder, out of position and the like The present disclosure provides the radar sensor system and a method of operating the radar sensor system to detect occupancy of the interior of the vehicle by extracting the set of features. The system may perform signal processing steps of Fast Fourier Transform (FFT) calculation, removal of static object reflections, and applying a threshold to extract the point cloud information. Successively, the set of features are extracted and provided to a classifier for all classification applications of the vehicle interior. The set of features that enable to provide all the above-listed features of in-cabin sensing, these features are extracted from point cloud information of the FMCW radar sensor, where these features may be used as an input to the classifier to distinguish the living object from other static objects.

Further, the system can use one sensor for more than one seat/zone in the vehicle. The present disclosure can cover a minimum of one seat per sensor up to a maximum of the full interior of the car with a single sensor spanning multiple rows, seats, footwell and trunk region. The system may include a radar sensor that may include a transmitter unit to transmit the radar signals, a receiver unit to receive the radar signals, a signal processing unit that performs fast FFT and thresholding techniques to extract the point cloud information. The present disclosure further includes the classifier to extract the feature set from the point cloud information to perform various classifier applications to determine any or a combination of life presence detection, seat occupancy detection, adult vs child classification and child left behind detection that carter to the in-cabin requirements of any automotive vehicle. The present disclosure can be described in enabling detail in the following examples, which may represent more than one embodiment of the present disclosure.

FIG. 1 illustrates an exemplary representation of a FMCW radar system for differentiating objects in a vehicle, in accordance with an embodiment of the present disclosure.

Referring to FIG. 1, frequency modulated continuous wave (FMCW) radar system 100 (also referred to as a system 100, herein) may be configured to differentiate objects 104 also interchangeably referred to as targets 104 in an interior of a vehicle, where the objects 104 may be an adult, child, infant and the like. The system 100 may include one or more sensors 102, for example, a radar sensor that may be mounted within the vehicle with its radio frequency (RF) emitting direction pointing towards the interior of the vehicle. The one or more sensors 102 may include transmitter unit 110, a receiver unit 112, a mixer 114, a low pass filter (LPF) 116, an analogue to digital converter (ADC) 118, a processor 106, and a classifier 120. The system 100 can classify the objects 104 into various classes to determine the life presence detection, seat occupancy detection, adult vs infant/child detection, child left behind detection, airbag deployment, out of position detection, airbag suppression, automated child lock and the like.

In an exemplary embodiment, the vehicle as presented in the example may be a four-wheeler vehicle, e.g., a car. As can be appreciated, the present disclosure may not be limited to this configuration but may be extended to other configurations such as bus, trucks and the like. In an embodiment, the at least one sensor may be preferably mounted within the vehicle to generate a set of signals in response to the object 104 being present/positioned in one or more zones within the vehicle. In another embodiment, different vehicles may require one or more sensor mounting configurations, where the sensor arrangement can be divided into one or more zones.

For example, the at least one sensor may cover more than one seat/zone/location in the car covering two rows, five seats, footwell and truck region, whereas one or more sensors may be used to increase the field of view (FoV) of the sensor in larger vehicles with 6/7/8 seaters. The one or more zones also interchangeably referred to as seat group may refer to the group of detection points that are from a predefined area within the vehicle, where the area can refer to the reflections from any objects 104 present in the single-seat location, single row location, trunk, multiple seats grouped, or the entire car. The area dimensions may be known with respect to the car and the sensor mounting in the car.

In an embodiment, the transmitter unit 110 may include at least one antenna to emit high-frequency signals (radar signals) illuminating the interior of the vehicle, the receiver unit 112 may include at least one antenna that may receive the emitted signals after getting reflected on the objects 104. The system 100 may use the transmitter unit 110 and receiver unit 112 to transmit and receive the signal frequency in GHz or any required suitable range. In an exemplary embodiment, the frequency range may include 60-64 GHz band, 77-81 GHz band and 24 GHz band and any combination thereof. The system 100 may emit the selected radar signals and receive the same signal back after reflecting from the object 104, where the reflected signal may include the information specifically about the reflected object.

Figure 2:
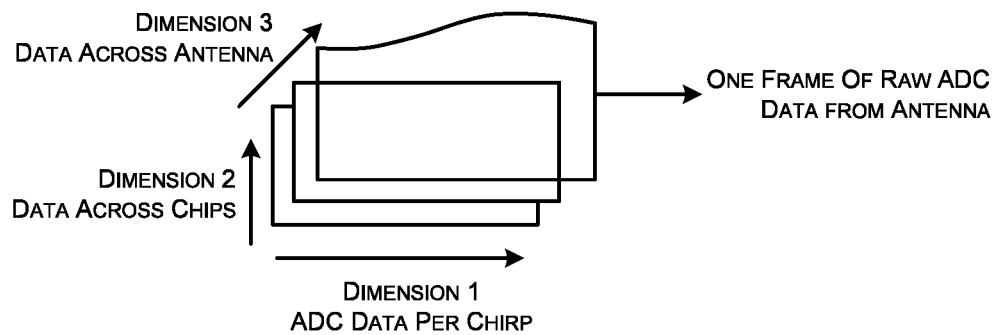
FIG. 2 illustrates an exemplary view of three dimensional (3D) Fast Fourier Transform radar cube representation, in accordance with an embodiment of the present disclosure.

In another embodiment, a mixer 114 may be operatively coupled to the transmitter unit 110 and the receiver unit 112 to combine the signals received from the transmitter unit 110 and the receiver unit 112, the mixer 114 may be operatively coupled to the LPF 116 to obtain the intermediate frequency signal also interchangeably referred to as the set of signals, which may be considered as an input data, where the intermediate frequency signal may include range, velocity and bearing angle information about the reflected object. The received intermediate signal has information from multiple reflections from all objects 104 in the FoV of the one or more sensors 102. The ADC 118 may convert the received set of signals to process in a digital domain in the processor 106. The set of signals also interchangeably referred to as input data may be collected using FMCW radar with any or a combination of single waveform pattern and multiple waveform patterns. In an exemplary embodiment, the waveform pattern may be up-chirp waveform pattern, with a constant slope. The input data may include one or more samples within the chirp, for more than one chirp and more than one receiver antenna, the input data may be arranged in a cube pattern as illustrated in FIG. 2 and explained in detail below.

In an exemplary embodiment, the processor 106 may be a signal processing unit. In an embodiment, the processor 106 may include a memory 108 for storing the information, where the memory 108 can be part of the processor 106 or can be a separate unit associated with the processor 106 depending upon the application. The processor 106 may receive the digital set of signals from the ADC 118 to extract prominent reflected signals. The processor 106 may process the received digital set of signals, to generate point cloud dataset also interchangeable referred to as point cloud information/list of the received digital set of signals using two-dimensional Fast Fourier Transform (2D FFT), thresholding technique, and Direction of Arrival (DoA) algorithm.

The 2D FFT may be processed across the samples in the chirp to process any or a combination of range information and velocity/doppler information, where a predefined threshold value (thresholding technique) may be used to detect the prominent reflection points in the received digital set of signals. The DoA algorithm may be used to estimate the bearing angle of the detected prominent reflection points. A grouping mechanism also interchangeably referred to as grouping unit may group the detected prominent reflection points based on the position with the region of interest within the vehicle and with respect to the mounted sensor. The resultant of all these signal processing may generate the point cloud dataset/list having details of the prominent reflection points, where the point cloud dataset may include the information about the range, angle (azimuth and/or elevation), velocity and/or reflected power of the targets, where the targets may include any or a combination of adult, children, baby, empty seats and other objects 104 inside the car that are within the FoV of the one or more sensors 102.

In an embodiment, the processor 106 may extract, from the point cloud dataset, first set of features pertaining to a single frame that may include any or a combination of the mean of values, and distribution of values. The processor 106 may extract, from the point cloud dataset, second set of features pertaining to a multi-frame that may include any or a combination of time-averaged values and variation over time value of the first set of features.

The first set of features also interchangeably referred to as single frame features that may include the mean and/or expectation of values i.e., expectation of position, range/angle normalized average power, expectation of power, expectation of velocity, number of detections, detection density, gating factor. In another embodiment, the single frame features may include distribution or spread of values i.e., position spread, spread in velocity, spread in power, velocity distribution, distribution of power, power distribution across velocity.

In an embodiment, the second set of features also interchangeably referred to as the multi-frame features that may include time averaged values and variation and/or distribution over time of the following values i.e., expectation of position, range/angle normalized average power, expectation of power, expectation of velocity, number of detections, detection density, gating factor, position spread, spread in velocity, spread in power, velocity distribution, distribution of power, power distribution across velocity.

In another embodiment, the one or more zones may be defined in any or a combination of two dimension and three dimensions, where the zones can be defined in cartesian or polar coordinates. The zones can be a single cuboid and/or rectangle or a group of multiple cuboids and/or rectangle, the zones specifically show the areas of interest in the point cloud dataset. For every frame the point clouds are grouped with respect to the different zones, the features are extracted based on the detection points that fall within each respective zone.

In another embodiment, the processor 106 may be operatively coupled to the classifier 120. In an exemplary embodiment, the classifier 120 may be any or a combination of a simple decision tree, discriminant analysis, support vector machines, neural network, and an ensemble of multiple classifiers. The classifier 120 may classify the extracted first set of features and the second set of features to extract a set of values i.e., output data from the classified set of features as explained in detail below. Based on the determination of the extracted set of values from the classified set of features, the processor 106 may be configured to differentiate the objects 104 present in the one or more zones within the vehicle, where the classifier 120 differentiate types of object 104 e.g., living from static objects, and object attributes, e.g., adult from child, human from pet and any combination thereof.

For example, the living objects, e.g., adult, child and pet may be differentiated from the static objects, e.g., empty child restraint system, water bottle, shaking the car, engine vibrations, corner reflectors and other noise signals. Similarly, deployment force for the airbag may be controlled based on the classification, where if the classification indicates that the adult is the seat occupant then the airbag is deployed in a normal manner. If the classification indicates that a child or infant is the seat occupant then the airbag may not be deployed or may be deployed at a significantly lower deployment force.

Thus, the system 100 can ensure a faster response time of less than a second, when compared to other existing radar-based approaches that use vital signs for occupancy detection. The system 100 can provide various in-cabin features that may include any or a combination of life presence detection, seat occupancy detection or occupancy detection, adult vs infant/child detection, a child left behind detection, passenger classification system, seat belt reminder, airbag deployment system, airbag suppression and the like. The system 100 can be capable to operate in any or a combination of contactless and low ambient light conditions and can be capable to operate even when the living objects are covered by some materials such as a blanket, jacket, sun cover, and cloth. Further, the system can be capable to distinguish a person leaning on the car door from baby sitting inside the car.

FIG. 2 illustrates an exemplary view of three dimensional (3D) Fast Fourier Transform radar cube representation, in accordance with an embodiment of the present disclosure.

Referring to FIG. 2, the input data may be collected using FMCW radar with any or a combination of single waveform pattern and multiple waveform patterns. In an exemplary embodiment, the waveform pattern may be up-chirp waveform pattern, with the constant slope. The input data may include multiple samples within the chirp, for more than one chirp and for more than one receiver antenna, the input data can be arranged in cube pattern.

The intermediate frequency signal may include range, velocity and bearing angle information about the reflected object 104, where the received intermediate signal may include information from multiple reflections from the objects 104 in the FoV of the one or more sensors 102. The distance of the object 104 from the radar and the relative velocity of the object 104 may be determined by the peaks in the 2D FFT of the input data, where the first dimension refers to the direction along the ADC samples within the chirp (also referred to as range direction) and the second dimension refers to the direction along the chirps (also referred to as velocity direction).

In an embodiment, the present disclosure can be used for the FMCW radar with a minimum of one transmitter antenna and one receiver antenna. In another embodiment, the FMCW radar with one or more transmitter and/or receiver antenna, may have object bearing angle related phase information across the antenna, where the third dimension refers to the object bearing angle related phase information across the antenna.

Figure 3:
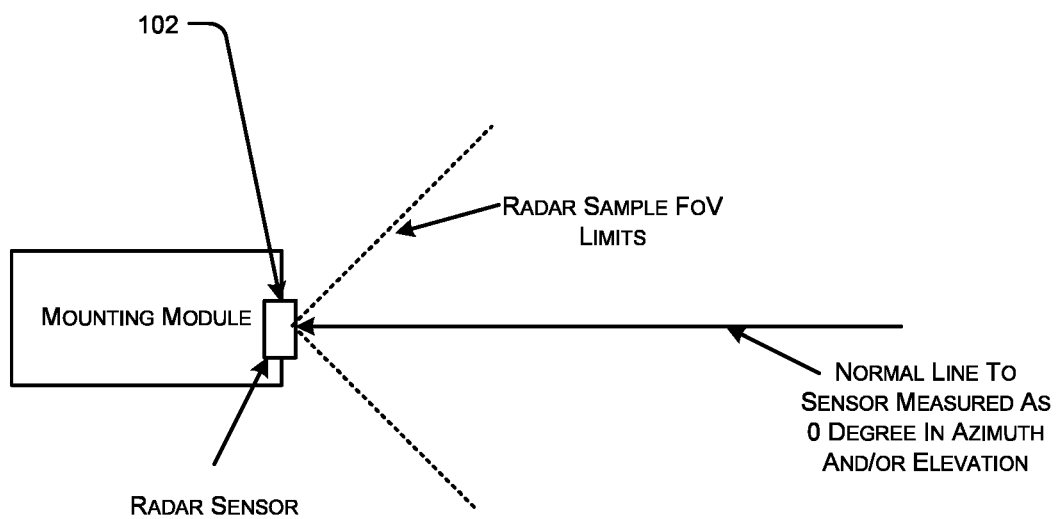
FIG. 3 illustrates an exemplary top view of the antenna averaged data at zero degrees angle, in accordance with an embodiment of the present disclosure.

In another embodiment, one or more transmitter and receiver antennas can be arranged only in one direction (either azimuth or elevation) or/and in both azimuth and elevation direction. To determine the bearing angle of the object 104 in both azimuth and/or elevation, as subtended from the objects 104 on the normal line as shown in FIG. 3, the 2D FFT may determine the bearing angle in azimuth and elevation. Other DoA estimation algorithms like barlett, Capon/(Minimum Variance Distortionless Response beamformer) MvDR, MUSIC, estimation of signal parameters via rotational invariant techniques (ESPRIT) or Matrix Pencil can be used for better accuracy and resolution with higher computation cost. The present disclosure is independent of the selected DoA algorithm.

The present disclosure describes the signal processing pipeline, including, but not limited to, range estimation, velocity estimation, threshold process and the DoA estimation. As can be appreciated, the present disclosure may not be limited to this signal processing pipeline but may be extended to other signal processing pipeline having range and velocity estimation followed by angle estimation (azimuth and/or elevation) and then thresholding to detect prominent reflection points. Another possible signal processing pipeline may include range and bearing angle estimation followed by thresholding and then velocity estimation. The resultant of all these signal processing pipeline may be the point cloud list having details of the prominent reflection points and their information may include position (range, angle), velocity and power. The present disclosure may include any signal processing pipeline that can provide the point cloud list or object list, which may include the information on the prominent peaks or reflections from the objects 104.

The point cloud list is a set of detection points, which represents the reflected signals, where the reflected signals are the peaks that may be seen in the fourier transform plots and these may be detected by the threshold techniques. The point cloud list has information about the range, angle (azimuth and/or elevation), velocity and/or reflected power of the targets, where the targets include any or a combination of adult, children, baby, empty seats and other objects 104 inside the car that are within the FoV of the one or more sensors 102.

In another embodiment, the features described in the present disclosure are with reference to the set of detection points within the one or more zones/seat group, where the zone/seat group can refer to the group of detection points that are from the predefined area within the vehicle. The area can refer to the reflections from any objects 104 present in the single seat location, single row location, trunk, multiple seats grouped, or the entire car. The area dimensions may be already known with respect to the car and the sensor mounting in the car, where the area may include, but not limited to, two-dimensions.

In another embodiment, the zones may be defined in any or a combination of two dimension or three dimensions, where the zones can be defined in cartesian or polar coordinates. The zones can be the single cuboid and/or rectangle or the group of multiple cuboids and/or rectangle, the zones specifically show the areas of interest in the point cloud. For every frame the point clouds are grouped with respect to the different zones. The features are extracted based on the detection points that fall within each respective zone. In a certain frame there might be no points within the zone or only one point or a plural of detection points. In an aspect, the present disclosure describes the different features that can be extracted from the point cloud list, where the set of features i.e., first set of features and the second set of features are extracted for the group of points that gets reflected from a signal object 104, each object can have singular or plural of detection points assigned.

The first set of features may include any or a combination of mean or expectation of values in a signal time instant (single frame) and distribution or spread of values in a single time instant (single frame). The second set of features may include any or a combination of time averaged values across time (multi-frames) and variation or distribution over time (multi-frames).

The features of signal time instant refer to the features that are derived from the current single frame, these features contribute to faster response time, wherein if faster response time is not a required feature of the system, then these features need not be included. The features derived over time includes the information over multi-frames, these features can represent the values that are present in the previous frames but may not be present in the current frame. These features provide a short-term memory feature to the classification process. These features may be responsible for consistent detection output irrespective of any changes in detection capability of the target.

The features defined by the mean, expectation or averaged values represent the object 104 information without any outliers. These set of features remove the noisy information and keep important centre value of the spread. The features defined by distribution, spread or variation represent the variation of values in the single frame or across multi-frames. In the single frame, this value represents the spread of the corresponding value across multiple points from the object 104. In the multi-frame, this value represents the variation over time.

The entire first set of features and the second set of features of the present disclosure are as follows: Mean or expectation of values in the signal time instant (single frame) may include expectation of position, range/angle normalized average power, expectation of power, expectation of velocity, number of detections, detection density, gating factor.

Distribution or spread of values in a single time instant (single frame) may include position spread, spread in velocity, spread in power, velocity distribution, distribution of power, power distribution across velocity.

Time averaged values (TMA) (multi-frames) may include TMA of expectation of position, TMA of range/angle normalized average power, TMA of expectation of power, TMA of expectation of velocity, TMA of number of detections, TMA of detection density, TMA of gating factor, TMA of position spread, TMA of spread in velocity, TMA of spread in power, TMA of velocity distribution, TMA of distribution of power, TMA of power distribution across velocity Variation or distribution over time (DoT) (multi-frames) may include DoT of expectation of position, DoT of range/angle normalized average power, DoT of expectation of power, DoT of expectation of velocity, DoT of number of detections, DoT of detection density, DoT of gating factor, DoT of position spread, DoT of spread in velocity, DoT of spread in power, DoT of velocity distribution, DoT of distribution of power, DoT of power distribution across velocity.

Expectation of position refers to the mean/averaged value of the different position information of the point cloud from the same zone. The position information can be in cartesian or polar coordinates. The position information can be represented in a three-dimensional form or in two-dimensional form. The expectation of position in 3D and in cartesian coordinates as a sample is given below:

Ex[Range]=Sum (Range$_i$)/N
Ex[Az angle]=Sum (az_angle$_i$)/N
Ex[El angle]=Sum (az_angle$_i$)/N, where Range$_i$ refers to the range value of $i^{th}$ point, az_angle$_i$ refers to the azimuth angle value of $i^{th}$ point, El_angle$_i$ refers to the elevation angle value of $i^{th}$ point and N refers to the total number of points in the group. Similarly, the expectation of position can be represented in XYZ coordinates. The expectation of the position information need not be always in three dimensional. The final set of features can include only the information from any one of the coordinates, or combination of two of the coordinates or all the three coordinates as described.

Range/angle normalized average power (Ex[Norm_Power]) refers to the mean/averaged value of normalized reflected power from all the points that belong to a specific zone and/or object Ex[Norm_Power]=Sum (Norm_Power$_i$)/N, where Norm_Power$_i$ refers to the normalized reflected power value of $i^{th}$ point and N refers to the total number of points in the group. The normalization of the reflected power value obtained from the point cloud can be achieved by the inverse antenna beam pattern. It is known that the reflected power reduces with increasing range and as the object's bearing angle is away from 0 degree. This reduction in power can be derived from the antenna beam pattern and/or by actual measurements. The reflected power value is compensated for this attenuation based on its position (range and/or angle). The normalization can be performed for range, azimuth angle and elevation angle together or a combination of either of two values or as individual three values. Hence, this feature range/angle normalized average power represents any one or few or all the seven combinations as described.

Expectation of power (Ex[Power]) refers to the mean/averaged value of reflected power from all the points that belong to a specific zone and/or object Ex[Power]=Sum (Power$_i$)/N, where Power $_i$ refers to the reflected power value of i$^{th}$ point and N refers to the total number of points in the group.

Expectation of velocity (Ex[Velocity]) refers to the mean/averaged value of relative velocity from all the points that belong to a specific zone and/or object Ex[Velocity]=Sum (Velocity$_i$)/N, where Velocity$_i$ refers to the relative velocity value of i$^{th}$ point and N refers to the total number of points in the group.

Number of detections is the total number of point cloud detections in the respective group or zone/seat.

Detection density (detect_density) refers to the density of detections from the object. This has information about the activity of the object/living person like stable or slight movements or breathing/heart rate movements or huge bodily movements.

Detect_density=[detection_volume]/N, where N refers to the total number of detections in the group and detection_volume refers to the volume of detections in the group and is determined by the [range_spread×Az_angle_spread×El_angle_spread]. The volume can also be determined by including only one angle information of either azimuth or elevation as [range_spread×angle_spread].

Gating Factor (GF) refers to the density of detections from the entire seat/zone and is defined as: GF=[Zone_volume]/N, where Zone_volume refers to the volume of the predetermined zone and N refers to the number of points from the zone. The zone might refer to specific seat positions and/or specific footwell regions and/or entire row and or entire footwell region and/or truck region and/or entire car and/or other combinations of regions within the car.

Positional Spread refers to the difference in maximum and minimum values of the different position information of the point cloud from the same zone. The position information can be in cartesian or polar coordinates. The position information can be represented in a three-dimensional form or in two-dimensional form. The expectation of position in 3D and in cartesian coordinates as a sample is given below:

Range_spread=(Range$_{max}$-Range$_{min}$)

Az_spread=(Az$_{max}$-Az$_{min}$)

El_spread=(El$_{max}$-El$_{min}$), where Range$_{max}$ refers to the maximum range value and Range$_{min}$ refers to the minimum range value among all the points from the group, Az$_{max}$ refers to the maximum azimuth angle value and Az$_{min}$ refers to the minimum azimuth angle value among all the points from the group, El$_{max}$ refers to the maximum elevation angle range value and El$_{min}$ refers to the minimum elevation angle value among all the points from the group. Similarly, the positional spread can be represented in XYZ coordinates (cartesian). The positional spread feature need not be always in three dimensional. The final set of features can include only the information from any one of the coordinates, or combination of two of the coordinates or all the three coordinates as described.

Spread in velocity (Velocity_spread) refers to the difference in the max and min values of the relative velocity from all the points that belong to a specific zone or object. Velocity_spread=(Velocity$_{max}$-Velocity$_{min}$), where Velocity$_{max}$ refers to the maximum range value and Velocity$_{min}$ refers to the minimum range value among all the points from the group.

Spread in Power (Power_spread) refers to the difference in the max and min values of the reflected power from all the points that belong to a specific zone or object. Power_spread=(Power$_{max}$-Power$_{min}$), where Power$_{max}$ refers to the maximum reflected power value and Power$_{min}$ refers to the minimum reflected power value among all the points from the group.

Velocity distribution (distrb_velocity) refers to the parameters representing the distribution of velocity in a position frame. The highest velocity detection point is selected as a peak in range-azimuth-elevation plane. The number of detections in the successive bins in this 3D plane is counted. If this number of detections is not zero, then the next successive bins in this 3D space is considered and the number of detections in this space is seen. This process is repeated till number of detections is zero or the extremes of the zone is reached. The velocity distribution is defined as the maximum number of detections across successive set of bins. Distrb_velocity=max (no_dectection$_i$), where no_dectection$_i$ refers to the number of detections in the i$^{th}$ set of bins around the peak value. The bins can be selected in any one of the three-position axis in cartesian or polar coordinates, or in combinations of two axis or along all the three axis also.

Distribution of power (distrb_power) refers to the parameters representing the distribution of reflected power in a position frame. The highest reflected power detection point is selected as a peak in range-azimuth-elevation plane. The number of detections in the successive bins in this 3D plane is counted. If this number of detections is not zero, then the next successive bins in this 3D space is considered and the number of detections in this space is seen. This process is repeated till number of detections is zero or the extremes of the zone is reached. The power distribution is defined as the maximum number of detections across successive set of bins, Distrb_power=max (no_dectection$_i$), where no_dectection$_i$ refers to the number of detections in the i$^{th}$ set of bins around the peak value. The bins can be selected in any one of the three-position axis in cartesian or polar coordinates, or in combinations of two axis or along all the three axis also.

Power distribution across velocity feature (Power_distrb_vel) refers to the distribution of detections points across velocity. The histogram of number of detections across different absolute velocity bins is calculated. This number of detections represent the distribution of power. This feature is calculated as the ratio of number of detections on the negative side of the peak to the number of detections on the positive side of the peak, Power_distrb_vel=(total no of detection on negative side of histogram peak)/(total no of detections on positive side of histogram peak). The negative side and positive side of the histogram pot is defined with respect to the peak of the histogram and the positive side refers to the increasing velocity value whereas the negative side refers to the decreasing velocity value.

The set of features grouped under time averaged (TMA) values represent a moving averaged value of the single frame features. The number of frames considered can be as low as zero or as high as total number of frames. The moving average is applied on the above defined thirteen single frame features belonging to both mean group and distribution group. $TMA_j(feature_i) = ALPHA \times TMA_{(j-1)}(feature_i) + feature_{i,j}$, where $feature_i$ refers to the $i^{th}$ feature from the previous list, $feature_{i,j}$ refers to the same $i^{th}$ feature on the $j^{th}$ frame or time instant. $TMA_j$ refers to the time average operation on the $j^{th}$ frame or time instant. ALPHA refers to the retention factor and takes a value between 0 to 1. A value of 0 for ALPHA means that there is no previous information and a value of 1 means that all previous values are included.

The time averaged feature can also be calculated in an instantaneous fashion as below:
$TMA_j(feature_i) = Sum(feature_{i-N} \ldots feature_i)/N$, where the feature values of the previous N frames is averaged. This approach also provides a time averaged feature value. If the above representation is modified as below, providing the same result, then it is less computationally intensive and is preferred for embedded implementation.

$$TMA_j(feature_i) = \{[TMA_{(j-1)}(feature_i) \times N] - feature_{i-N} + feature_i\}/N$$

The set of features grouped under distribution over time (DoT) features represent the variation or spread of all the single frame features over time or multi-frames. The number of frames considered can be as low as zero or as large as the current total number of frames. The distribution over time value for a feature is the difference between the maximum value and the minimum value of the feature across a predefined set of frames (N) and is presented as the formula below:

$$DoT_j(feature_i) = Max\{feature_{i-N} \ldots feature_i\} - Min\{feature_{i-N} \ldots feature_i\}$$

Both time-averaged implementation and distribution over time implementation may be applied for all the thirteen single frame features that are listed and explained above. The extracted thirty-nine features are evaluated for minimum redundancy and maximum relevance to the classification. Each feature mentioned here has a major role in the classification of at least one of the use cases of in-cabin sensing.

These features extracted from the point cloud information can be provided to the classifier 120 to distinguish living vs static object, distinguish infant vs child vs adult, and distinguish human vs pet. The described features of the present disclosure can be used in any combination for the desired results. The selection of features from the set of twenty-six features obtained based on memory availability, the complexity of classifier 120, the linearity of the classifier 120, use case, feature and required region of interest.

The selection of features coupled with the classifier 120 can be used to perform all the radar-based in-vehicle applications such as life presence detection, seat occupancy detection, adult vs child classification, child and/or pet left behind detection, passenger classification system, out of position, automatic child lock, intrusion detection, seat belt reminder, airbag deployment, airbag suppression, airbag low-risk deployment and the like.

FIG. 3 illustrates an exemplary top view of the antenna averaged data at zero degrees angle, in accordance with an embodiment of the present disclosure. As shown in FIG. 3, the FMCW radar with one or more transmitter and/or receiver antenna may have an object bearing angle related phase information across the antenna. The one or more transmitter and receiver antennas can be arranged only in one direction (either azimuth or elevation) or/and in both azimuth and elevation direction, to determine the bearing angle of the object 104 in both azimuth and/or elevation, as subtended from the objects 104 on the normal line, the 2D FFT may determine the bearing angle in azimuth and elevation. Other DoA estimation algorithms like barlett, Capon/MvDR, MUSIC, ESPRIT or Matrix Pencil can be used for better accuracy and resolution with higher computation cost. The present disclosure is independent of the selected DoA algorithm.

Figure 4:
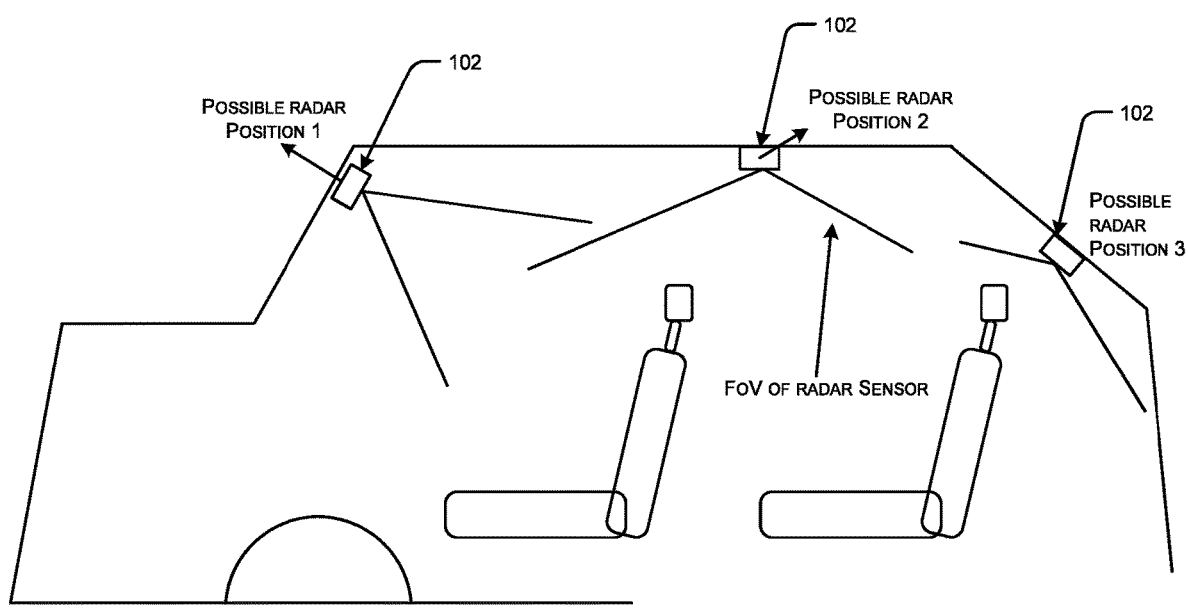
FIG. 4 illustrates an exemplary view of the radar mounting position within the vehicle, in accordance with an embodiment of the present disclosure.

FIG. 4 illustrates an exemplary view of the radar mounting position within the vehicle, in accordance with an embodiment of the present disclosure. As shown in FIG. 4, the one or more sensors 102 mounted inside the vehicle with its RF emitting direction pointing towards the interior of the vehicle, for example, the one or more sensors 102 mounted in front, top and rear portion within the vehicle. The system 100 of the present disclosure tuned to operate the one or more sensors 102 placed at any position as long as the FoV of the sensor covers the required region of interest. The present disclosure may be extensively used in all automotive such as passenger cars, trucks, buses and the like.

Figure 5:
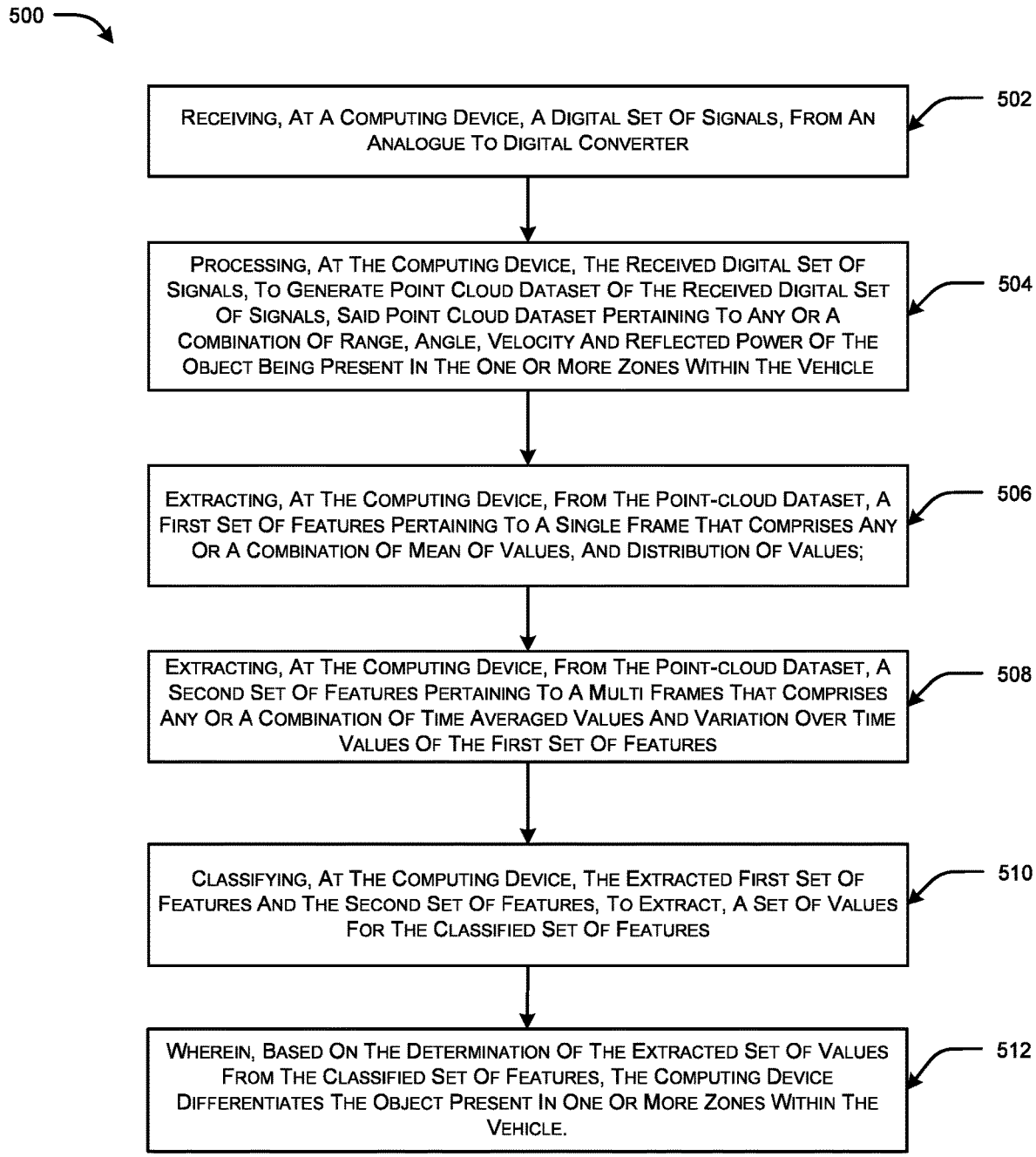
FIG. 5 illustrates an exemplary flow diagram of a method for differentiating objects in a vehicle, in accordance with an embodiment of the present disclosure

FIG. 5 illustrates an exemplary flow diagram of a method for differentiating objects in a vehicle, in accordance with an embodiment of the present disclosure.

Referring to FIG. 5, method 500 can be implemented using a computing device, which can include the processors 106. At block 502, the computing device may receive a digital set of signals from an analogue-to-digital converter (ADC), the ADC configured to receive the set of signals from one or more sensors and convert the received set of signals to a digital form, the one or more sensors adapted to be placed within a vehicle to generate the set of signals in response to an object being present in one or more zones within the vehicle.

At block 504, the computing device may process the received digital set of signals, to generate point cloud dataset of the received digital set of signals, the point cloud dataset pertaining to any or a combination of range, angle, velocity and reflected power of the object being present in the one or more zones within the vehicle.

At block 506, the computing device may extract, from the point cloud dataset, the first set of features pertaining to a single frame that may include any or a combination of mean of values, and distribution of values. At block 508, the computing device may extract, from the point cloud dataset, the second set of features pertaining to a multi-frame that may include any or a combination of time averaged values and variation over time values of the first set of features.

At block 510, the computing device may classify the extracted first set of features and the second set of features to extract a set of values for the classified set of features. At block 512, the computing device may be configured to differentiate the object positioned in one or more zones within the vehicle, based on the determination of the extracted set of values from the classified set of features.

It will be apparent to those skilled in the art that the system 100 of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

Advantages of the Present Disclosure

The present disclosure provides a system that can use at least one sensor to cover more than one seat/location, with a minimum of one sensor per seat to a maximum of one sensor per whole car covering two rows, five seats, footwell and truck region The present disclosure provides a system that can be extended to larger vehicles like 6/7/8 seaters by increasing the field of view of the sensor and/or by adding additional sensors of same type.

The present disclosure ensures faster response time of less than a second, when compared to other existing radar-based approaches that use vital signs for occupancy detection The present disclosure provides a system that can cater various in-cabin features The present disclosure provides a system that can be capable to operate under contactless and low ambient light condition.

The present disclosure provides a system that can be capable to operate even when the living objects are covered by some materials such as blanket, jacket, sun cover, cloth and the like.

The present disclosure provides a system that can be capable to distinguish person leaning on the car door from a baby sitting inside the car.

We claim:

1. A system for differentiating objects present in a vehicle, said system comprising:
    one or more sensors adapted to be placed within the vehicle to generate a set of signals in response to an object being present in one or more zones within the vehicle;
    an analogue-to-digital converter (ADC) configured to receive the set of signals and convert the received set of signals to a digital form; and
    a processor operatively coupled to the one or more sensors, the processor operatively coupled to a memory, said memory storing instructions executable by the processor to:
        receive, from the ADC, the digital set of signals;
        process the received digital set of signals to generate point cloud dataset of the received digital set of signals, said point cloud dataset pertaining to any or a combination of range, angle, velocity and reflected power of the object being present in the one or more zones within the vehicle;
        extract, from the point cloud dataset, a first set of features pertaining to a single frame that comprises any or a combination of mean of values, and distribution of values;
        extract, from the point cloud dataset, a second set of features pertaining to a multi-frame that comprises any or a combination of time averaged values and variation over time values of the first set of features; and
        classify the extracted first set of features and the second set of features to extract a set of values for the classified set of features,
        wherein, based on the determination of the extracted set of values from the classified set of features, the processor differentiates the object present in one or more zones within the vehicle.

2. The system as claimed in claim 1, wherein the one or more sensors comprise a transmitter unit that emits signals onto the object, and a receiver unit that receives the emitted signals reflected from the object.

3. The system as claimed in claim 2, wherein the one or more sensors comprise a mixer that combines the signals received from the transmitter unit and the receiver unit.

4. The system as claimed in claim 1, wherein the processor performs fast fourier transform on the received digital set of signals to calculate any or a combination of range and velocity of the received digital set of signals, wherein, the processor detects prominent reflection points of the received digital set of signals based on predefined threshold value.

5. The system as claimed in claim 4, wherein the processor performs bearing angle estimation of the detected prominent reflection points, and a grouping unit groups the detected prominent reflection points.

6. The system as claimed in claim 1, wherein the processor operatively coupled to a classifier that receives the extracted first set of features and the second set of features to differentiate types of objects, object attributes, and any combination thereof.

7. The system as claimed in claim 1, wherein the extracted set of features comprise any or a combination of expectation of position, range/angle normalized average power, expectation of power, expectation of velocity, number of detections, detection density, gating factor, position spread, spread in velocity, spread in power, velocity distribution, distribution of power, and power distribution across velocity.

8. The system as claimed in claim 7, wherein the number of detections comprises total number of point cloud detections in respective one or more zones, the detection density comprises volume of detections in the one or more zones, and the gating factor comprises the density of detections from the entire one or more zones, wherein the one or more zones comprises any or a combination of specific seat positions, specific footwell regions, entire row, entire footwell region, truck region, and entire vehicle.

9. The system as claimed in claim 7, wherein the velocity distribution and the distribution of power comprises maximum number of detections across successive set of bins, and the power distribution across velocity comprises a ratio of total number of detections on negative side of histogram peak by total number of detections on positive side of histogram peak.

10. A method for differentiating objects present in a vehicle, said method comprising:
    receiving, at a computing device, a digital set of signals, from an analogue-to-digital converter (ADC), the ADC configured to receive the set of signals from one or more sensors and convert the received set of signals to a digital form, the one or more sensors adapted to be placed within a vehicle to generate the set of signals in response to an object being present in one or more zones within the vehicle;
    processing, at the computing device, the received digital set of signals, to generate point cloud dataset of the received digital set of signals, said point cloud dataset pertaining to any or a combination of range, angle, velocity and reflected power of the object being present in the one or more zones within the vehicle;
    extracting, at the computing device, from the point cloud dataset, a first set of features pertaining to a single frame that comprises any or a combination of mean of values, and distribution of values;
    extracting, at the computing device, from the point cloud dataset, a second set of features pertaining to a multi-frame that comprises any or a combination of time averaged values and variation over time of the first set of features; and
    classifying, at the computing device, the extracted first set of features and the second set of features to extract a set of values for the classified set of features, wherein, based on the determination of the extracted set of values from the classified set of features, the computing device differentiates the object present in one or more zones within the vehicle.

\* \* \* \* \*